United States Patent
Vu et al.

(10) Patent No.: US 7,636,338 B1
(45) Date of Patent: Dec. 22, 2009

(54) ACCESS POINT CONFIGURATION

(75) Inventors: Chuong Vu, San Jose, CA (US); James Chieh-Tsung Chen, Santa Clara, CA (US); Chor-Teck Law, Milpitas, CA (US); Brian Bosso, San Jose, CA (US); Eric B. Janofsky, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 861 days.

(21) Appl. No.: 10/888,307

(22) Filed: Jul. 9, 2004

(51) Int. Cl.
*G06F 15/16* (2006.01)
(52) U.S. Cl. ................................. 370/338; 455/420
(58) Field of Classification Search .............. 455/410, 455/411, 426.2, 422.1, 423, 466, 463, 41.2, 455/420; 330/338
See application file for complete search history.

(56) References Cited

U.S. PATENT DOCUMENTS 6,645,075 B1* 11/2003 Gatto et al. ................... 463/25
2004/0223619 A1* 11/2004 Jablon ......................... 380/277
2005/0073980 A1* 4/2005 Thomson et al. ............. 370/338
2005/0176420 A1* 8/2005 Graves et al. ................ 455/424
2005/0287950 A1* 12/2005 Helden et al. ............... 455/41.2

OTHER PUBLICATIONS

"Part 16: Air Interface For Fixed Broadband Wireless Access Systems", IEEE 802.16, IEEE Standard For Local And Metropolitan Area Networks, Oct. 1, 2004.
"System Requirements For IEEE 802.20 Mobile Broadband Wireless Access Systems—Version 14", IEEE Standards Working Group 802.20, Jul. 16, 2004, vol. 16.

* cited by examiner

*Primary Examiner*—Sam Bhattacharya

(57) ABSTRACT

Systems and methods are provided for automatically setting up an initial configuration of a wireless client (i.e., for a first wireless client and subsequent wireless clients added to a network), including keyboard-less and (graphical user interface) GUI-less clients, and an access point without using confusing manual configuration utilities.

23 Claims, 13 Drawing Sheets

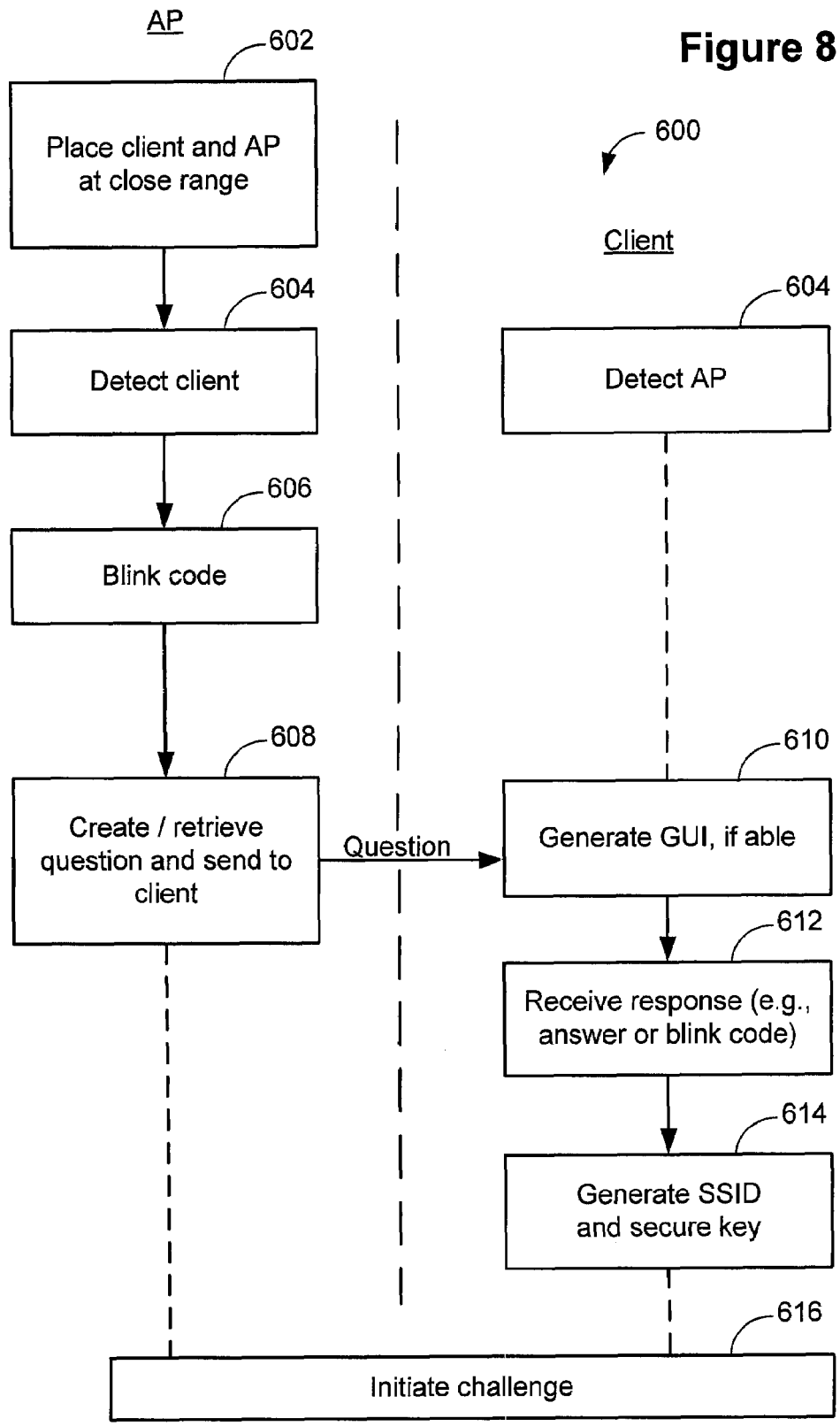

ACCESS POINT CONFIGURATION

BACKGROUND

In a conventional wireless local area network (WLAN), an access point (AP) is a station that transmits and receives data (sometimes referred to as a transceiver). A conventional AP connects users to other users within the network and also can serve as the point of interconnection between the WLAN and a fixed wire network. Each AP can serve multiple users within a defined network area. As users move beyond the range of one AP, they can be automatically handed over to the next one. A small WLAN may only require a single AP. Conventionally, the number of APs required increases as a function of the number of network users and the physical size of the network.

APs are typically shipped with a default configuration to allow connection of wireless clients, but most require an elaborate and confusing manual configuration procedure to set up a new AP or new client (e.g., a wireless card, embedded wireless local area network on motherboard (WLAM), etc.). with security features enabled. For example, the following instructions describe how to manually configure a particular wireless connection.

A user opens a client configuration program for a wireless client. A new wireless network configuration can be generated or a default configuration edited. To connect to an AP, the AP is activated. The user must enter a network name or Secure Set ID (SSID) name for the network. Alternately, the user can scan for an available network. To specify a name, the user looks for a network name or SSID option in the configuration utility. The user must ensure that their network card's name or SSID setting is identical to the network name or SSID assigned to the AP. The user enables a security selection, for example enabling wired equivalent privacy (WEP) encryption and enters one or more keys. The keys on the user device and AP must be identical and the same key type (encryption level and hexadecimal or ASCI format) must be used on every device. The user then saves the configuration and attempts to connect the user device to the AP.

SUMMARY

In one implementation, an access point is provided that includes a transmitter to transmit at low power configuration packets to a proximately located client and to send messages to the proximately located client. The access point includes a receiver to receive a client input from the proximately located client, an engine to generate a unique service set identifier (SSID) and a secure key from the client input and a verification engine to verify a client text encrypted by the client with the secure key. The verification engine can, alternatively, encrypt challenge text for verification by the client.

In another aspect, a wireless client is provided that includes a transmitter to transmit at low power configuration request packets to a proximately located AP and to send messages to the proximately located AP. The wireless client includes a receiver to receive input from the proximately located AP, an engine to generate a unique service set identifier (SSID) and a secure key from the input and a verification engine to verify a AP text encrypted by the AP with the secure key. The verification engine can, alternatively, encrypt challenge text for verification by the AP.

Other wireless client and access point configurations are described in greater detail below.

Systems and methods are provided for automatically setting up an initial configuration of a wireless client (i.e., for a first wireless client and subsequent wireless clients added to a network), including keyboard-less and (graphical user interface) GUI-less clients, and access point without using confusing manual configuration utilities.

Configuration information is shared between a client and an access point in a manner designed to minimized security compromises, such at unwanted snooping.

Updating configuration information between a client and an access point is automatic and does not require detailed system knowledge for use with a manual configuration utility.

The addition of multiple clients to an access point avoids usage of complex manual configuration utilities and provides security to prevent security compromises such as unwanted snooping and rogue client access.

Other features and advantages are apparent from the following description, and from the claims.

DESCRIPTION OF DRAWINGS

FIG. 8 is an interaction diagram of an alternative process to initialize subsequent clients.

Like reference symbols in the various drawings indicate like elements.

DETAILED DESCRIPTION

Figure 1:
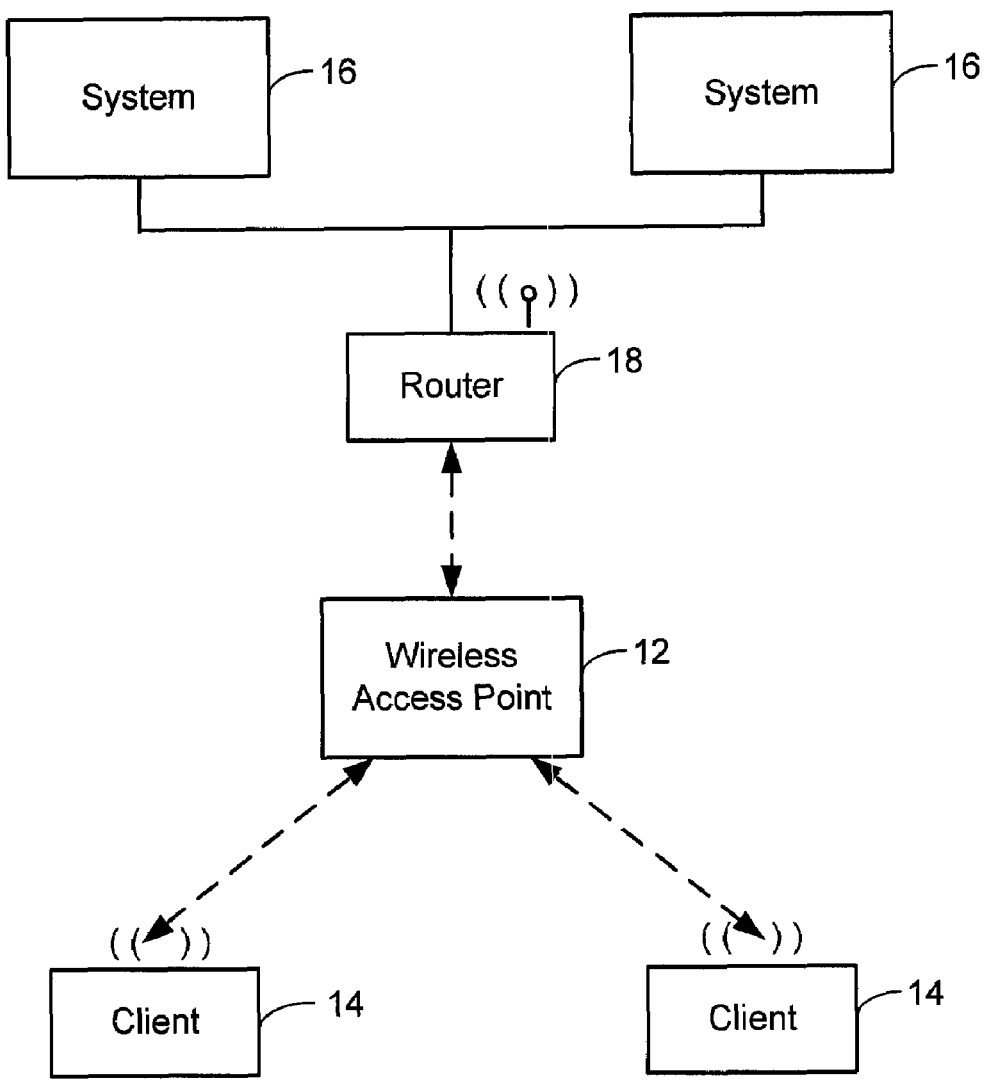
FIG. 1 is a block diagram of an exemplary network.

FIG. 1 is a block diagram of a network 10. In network 10, an access point (AP) 12 is provided and allows multiple clients (e.g., wireless clients 14) to connect with multiple systems 16 through, for example, a router or switch 18. Standards, such as IEEE 802.11, 802.11b, 802.11a, 802.11g, 802.11n, 802.16 and 802.20 for example, specify the technologies for wireless communications (e.g., wireless local area networks (WLANs)). In the configuration shown in FIG. 1, the AP 12 communicates wirelessly with both clients 14 and router 18. Other configurations are possible, including wired connections to clients and other network devices (e.g., router 18).

With respect to wireless communications, the AP 12 has a finite range. The AP 12 receives and transmits data between the wireless clients 14 and the multiple systems 16. Thus, the AP 12 enables access to server resources associated with the multiple systems 16 for each client.

Figure 2A:
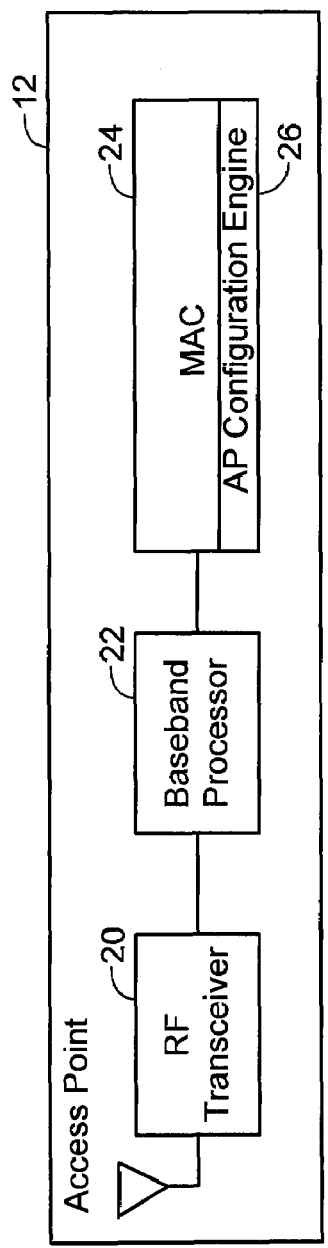
FIGS. 2A and 2C are block diagrams of an exemplary AP.

In a particular example, the AP 12 can be a transceiver including both a transmitter and a receiver for wireless communication. As shown in FIG. 2A, an AP 12 embodied as a transceiver includes, for example, a radio frequency (RF) transceiver 20, a baseband processor 22 and a media access controller (MAC) 24. RF transceiver 20 receives and transmits data from/to clients 14 and other network devices. Baseband processor 22 processes the RF signals from/to baseband in conformance with the radio frequency transmission protocol in use by the AP 12. MAC 24 includes one or more processing engines for processing received/and to be transmitted signals and interfacing with the network components.

MAC 24 includes an AP configuration engine 26 for initializing and updating configuration information with clients 14. AP configuration engine 26 generates a service set identifier (SSID), secure key and personal identification numbers (PIN) as required. AP configuration engine 26 can be of the form of hardware (circuits), software, firmware or combinations thereof. MAC 24 can include one or more interfaces (not shown) for communication with other network components, including wired Ethernet, blue tooth, universal serial bus (USB) and a short distance point to point wireless link (e.g., infrared or blue tooth). The AP 12 transmits configuration packets to proximately located clients 14 (in one implementation, using low power), sends messages to and receives messages from the proximately located clients 14.

Figure 2C:
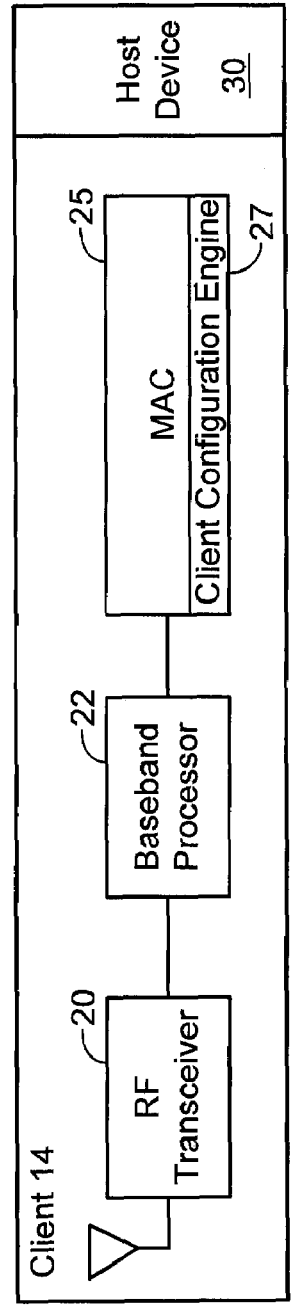
Figure 2B:
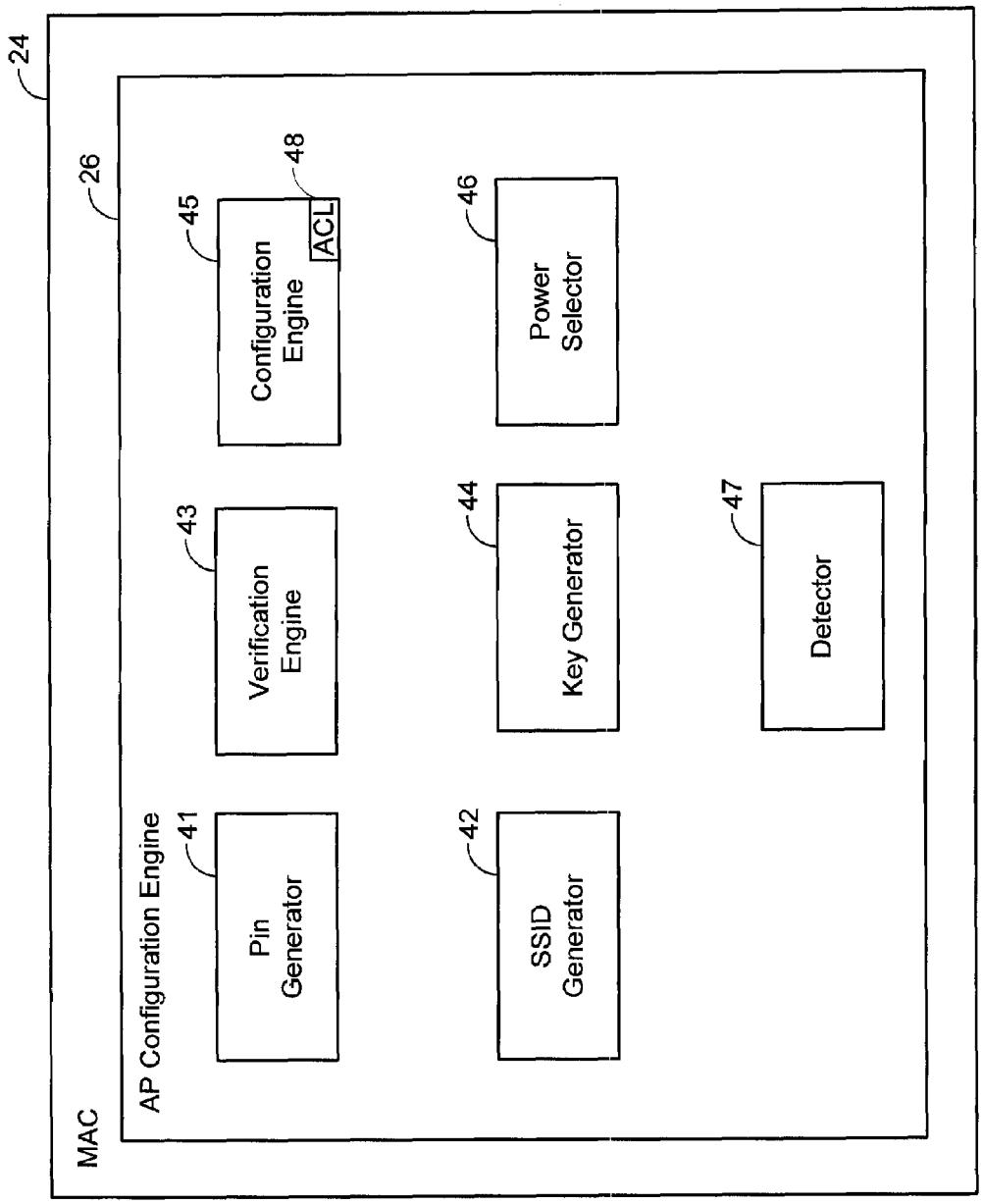
FIGS. 2B and 2D are block diagrams of an exemplary client.

Referring now to FIG. 2B, the AP MAC 24 is shown in greater detail. AP configuration engine 26 includes a pin generator 41, SSID generator 42, verification engine 43, key generator 44, configuration engine 45, power selector 46 and detector 47.

Pin generator 41 generates one or more PINs based on input. A PIN can be generated with or without client input. A PIN can be used as a seed to produce an SSID and key (e.g., WPA key). SSID generator 42 includes one or more routines for producing SSIDs, using for example, a PIN as an input. Other input can include other user data, including answers to questions prompted by the AP 12. SSIDs are discussed in greater detail below.

Verification engine 43 issues challenges to or compares responses from the client 14. In one implementation, verification engine 43 includes encryption and decryption services (not shown) for encrypting or decrypting communications with the client 14.

Key generator 44 generates keys for use in encrypting communications between the AP 12 and client 14. In one implementation, key generator 44 receives a seed for producing keys from the client user (e.g., a response to a question or a PIN).

Configuration engine 45 generates and processes configuration packets and messages. More specifically, configuration processor 45 generates configuration initialization packets for transmission to, and processes responses or configuration packet requests from clients 14. Configuration engine 45 can include an access control list (ACL) 48. In one particular example, the ACL 48 is a table that tells the AP 12 whether access rights are granted to a particular client 14.

Power selector 46 is operable to change the transmission output power for the transceiver 20. In one implementation, while broadcasting multicast transmissions to clients 14 during configuration, power selector 46 reduces the transmission output power to a low power level (e.g., 2 dBm) for a predetermined period to avoid snooping.

Detector 47 is operable to detect clients 14 within a predetermined range (e.g., proximately positioned clients). In one implementation, detector 47 detects configuration packet requests broadcast from a client 14. Alternatively, detector 47 detects using other conventional technologies including infrared detection technology.

Referring to FIG. 2C, the client 14 may include a similar transceiver for interacting with the AP 12. A client transceiver can include the transceiver 20, baseband processor 22 and a MAC 25. RF transceiver 20 receives and transmits data from/to the AP 12. Baseband processor 22 processes the RF signals from/to baseband in conformance with the radio frequency transmission protocol in use by the AP 12. MAC 25 includes one or more processing engines for processing received/and to be transmitted signals and includes a client configuration engine 27 for initializing and updating configuration information with the AP 12. Client configuration engine 27 can be of the form of hardware (circuits), software, firmware or combinations thereof. MAC 25 provides a network interface to the host device 30 resident on the client 14. Client 14 can transmit configuration request packets to or otherwise signal a proximately located AP 12 (in one implementation, using low power), send messages to and receive messages from the AP 12. Client configuration engine 27 interacts with the AP configuration engine 26 (FIG. 2B) to initialize or update configuration information and can be configured to generate a service set identifier (SSID), secure key and personal identification numbers (PIN), and verify/challenge AP communications as required.

The client 14 may also include one or more input, output (I/O) devices 15 (FIG. 2D) (e.g., a button, a keyboard, and a GUI) and routines for interacting with the user (e.g., set-up routines, GUI routines), the operation of which will be discussed in greater detail below.

Figure 2D:
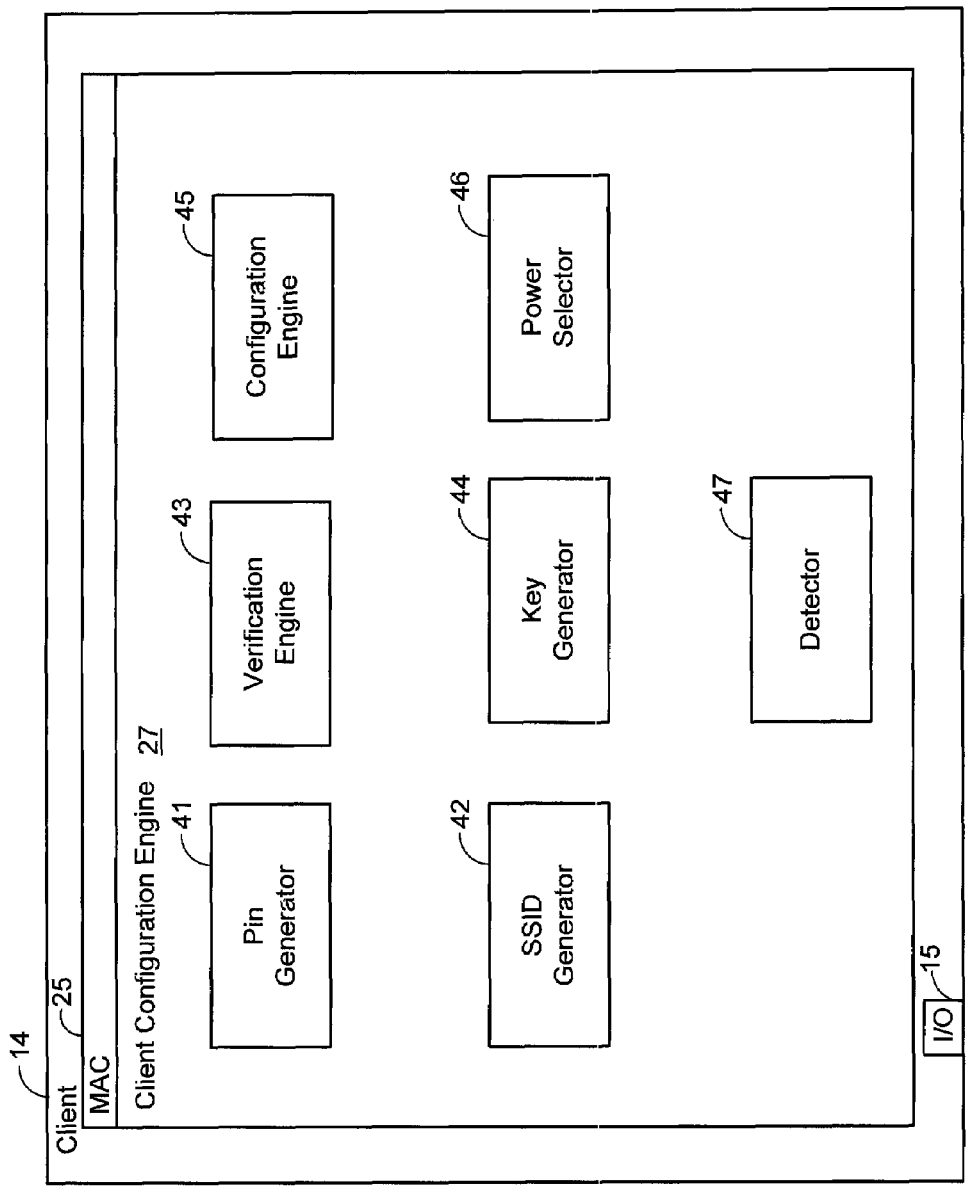

Referring now to FIG. 2D, the client MAC 25 is shown in greater detail. Client configuration engine 27 includes a SSID generator 42, verification engine 43, key generator 44, configuration engine 45, power selector 46 and detector 47. In one implementation, client configuration engine 27 includes a pin generator 41. In general, the function and operation of the respective engines is similar to that of the corresponding engines (but from the perspective of the client) in the AP 12, the details of which are discussed in greater detail below.

SSID generator 42 includes one or more routines for producing SSIDs, using for example, a PIN as an input. Other input can include other user data, including answers to questions prompted by the AP 12. In one implementation, SSIDs are provided from the AP 12, and accordingly, no SSID generator 42 is required.

Verification engine 43 issues challenges to or compares responses from the AP 12. In one implementation, verification engine 43 includes encryption and decryption services (not shown) for encrypting or decrypting communications with the AP 12.

Key generator 44 generates keys for use in encrypting communications between the AP 12 and client 14. In some implementations, key generator 44 receives a seed for producing keys from the client user (e.g., a response to a question or a PIN) or alternatively from the AP 12.

Configuration engine 45 generates configuration request packets for transmission to, and processes responses or configuration packets received from AP 12.

Power selector 46 is operable to change the transmission output power for the transceiver. In one implementation, while broadcasting transmissions to the AP during configuration, power selector 46 reduces the transmission output power to a low power level (e.g., 2 dBm) for a predetermined period to avoid snooping.

Detector 47 is operable to detect APs within a predetermined range (e.g., proximately positioned clients). In one implementation, detector 47 detects configuration packets broadcast by the AP 12. Alternatively, detector 47 detects using other conventional technologies including infrared detection technology.

In one implementation, the AP 12 includes a wide variety of configuration settings that are preset at the time of manufacture but manually configurable by a user. For example, the AP 12 can include a default service set identifier (SSID) parameter. The SSID defines the name of a wireless network that clients associate with. To improve security, a user changes the SSID to a non-default value to minimize unauthorized users from associating with the AP. If SSID broadcasting is disabled, most client device operating systems (e.g., Windows XP) cannot "snoop" the SSID from AP beacons and automatically associate with the AP.

The AP 12 can include an encryption parameter. In one implementation AP 12 supports wired equivalent privacy (WEP) encryption, which encrypts the frame body (not headers) of each data frame. Other encryption protocols including Wireless Application Protocol (WAP) can be supported.

As part of the IEEE 802.11 standard media access control (MAC) functions, APs implement the default IEEE 802.1 open system authentication and sometimes shared key authentication. Neither one of these forms of authentication provides very good security. As a result, in one implementation AP 12 includes 802.1x mechanisms that authenticate users with an external authentication server.

For the ordinary user, procedures used to adjust and tune the above parameters for successful set-up and configuration of a client and AP are very difficult and at times, daunting.

Figure 3A:
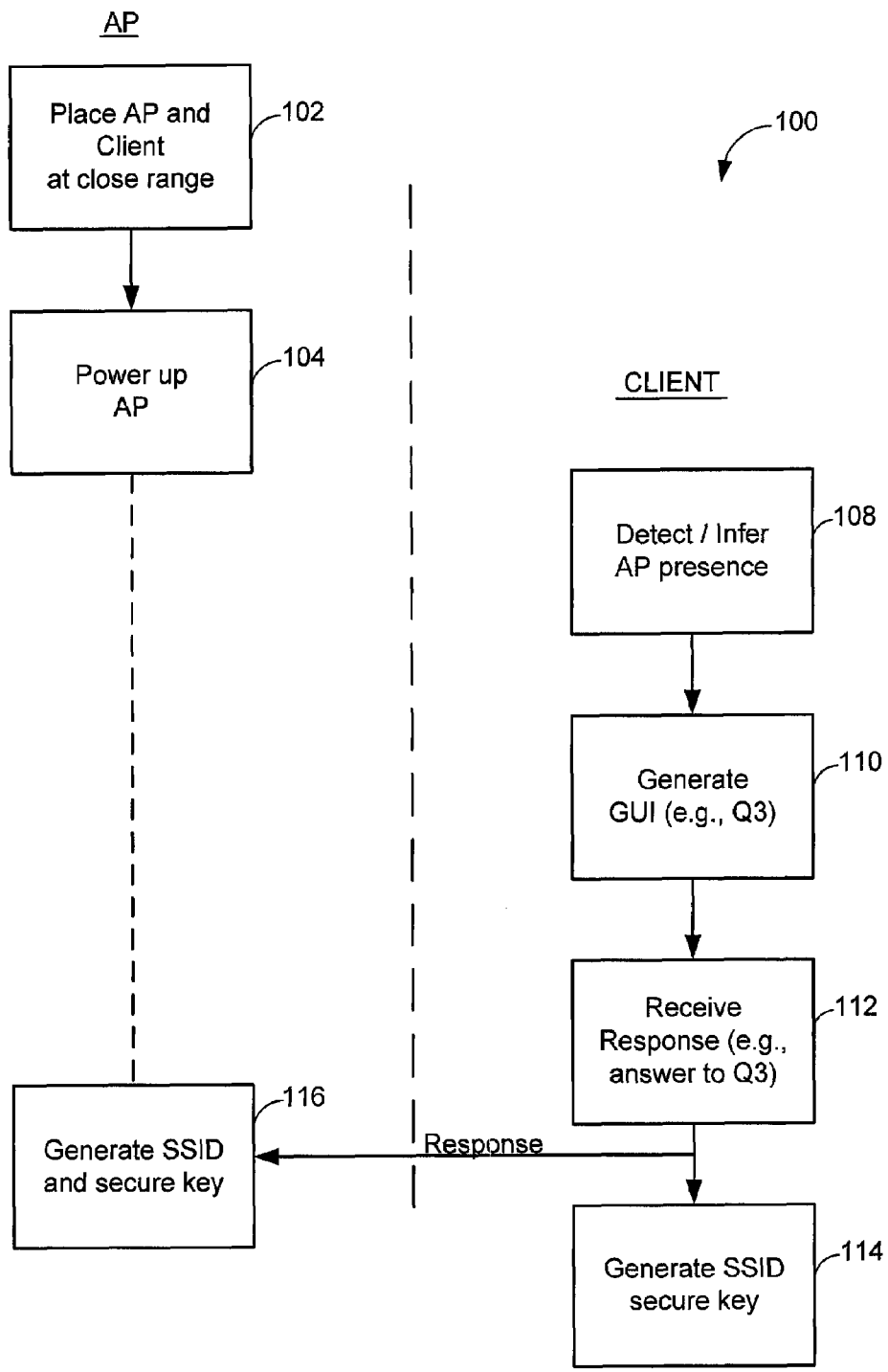
FIGS. 3A and 3B are interaction diagrams of a process to set-up an access point (AP) initially using a wireless client having a graphical user interface (GUI) and keyboard.
Figure 3B:
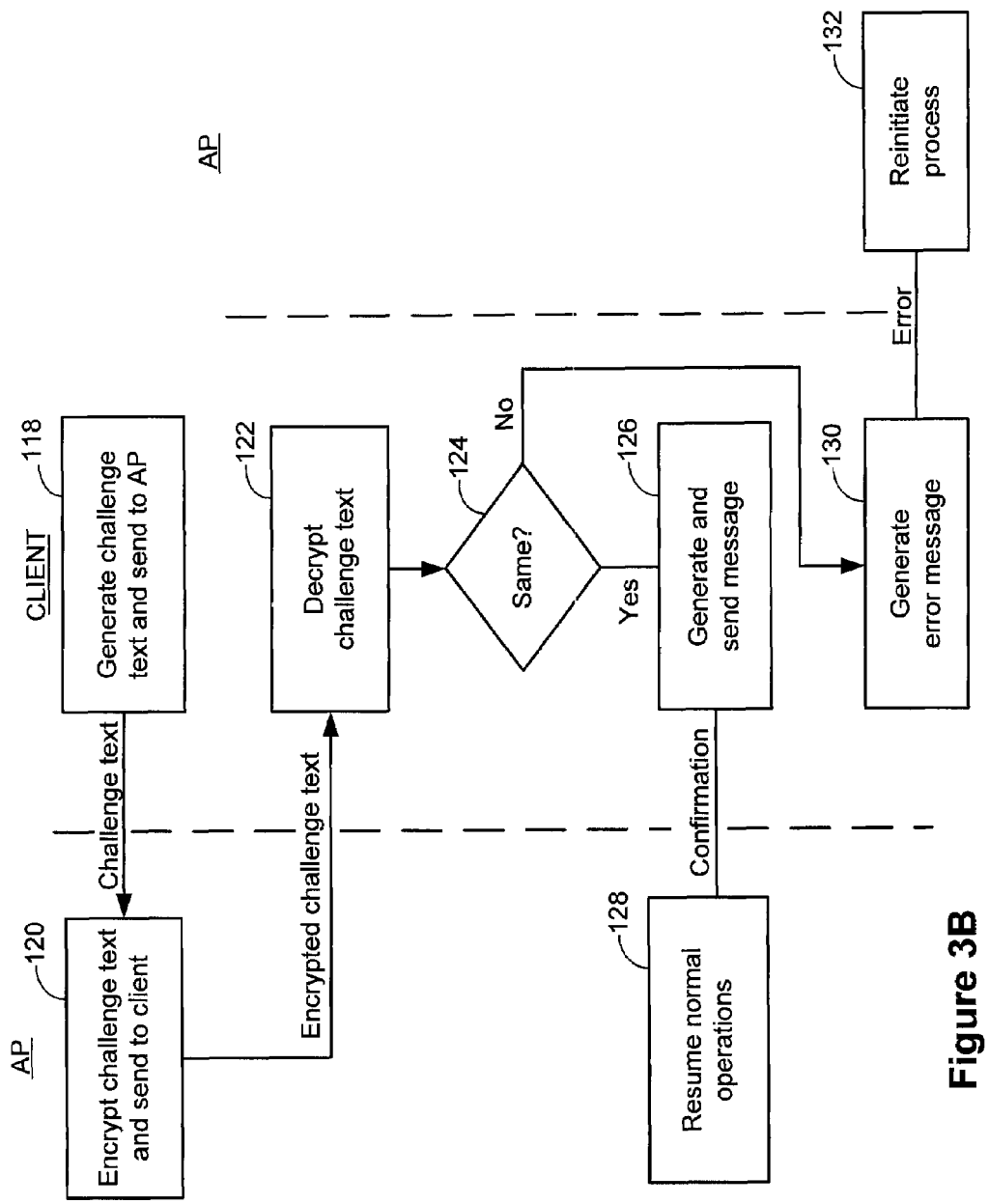

FIGS. 3A-3B are interaction diagrams of a process 100 to set-up an AP initially using a client having a graphical user interface (GUI) and keyboard. FIG. 3A shows the first part of the interaction including the generation of an SSID and secure key. FIG. 3B shows a second part of the interaction including a challenge process. The client 14 can be a wireless client of the form of a desktop or laptop computer, a personal desktop assistant, a wireless telephone including cellular telephone or the like. Referring to FIGS. 1, 2A-D, and 3A-3B, process 100 includes placing (102) an AP 12 in close proximity to a client 14 (e.g., less than 14 meters apart if wireless). The client 14 can be linked to the AP 12 either wirelessly or by a physical link, such as, for example, Ethernet, hardwire (e.g., firewire), serial, Universal Serial Bus (USB) or a short distance point to point wireless link (e.g., infrared or blue tooth). The linking of the client by the physical link is for the purposes of configuration as discussed herein. Other communications between the AP 12 and the client 14 can be wireless. The AP 12 is powered on (104) and the client detects/infers (e.g., using detector 47) the presence of the AP (108). In one implementation, a detection process includes the AP generating (e.g., using configuration engine 45) and broadcasting configuration packets (e.g., using the transceiver 20 in AP 12) to the client 14 (e.g., at low power using the power selector 46 to prevent unwanted snooping when transmitted wirelessly). In a particular example, configuration packets are multicast at 2 dBm. Multicasting can be continuous or for a predetermined period of time. If the client 14 and the AP 12 are connected by a physical linked (hereafter referred to as "wired"), the AP 12 transmits configuration packets to the client 14 using the physical link. Alternatively, the client 14 can infer the presence of the AP 12 and enter a default configuration mode. For example, the user may enter the configuration mode by executing a program on the client. After power up, the AP 12 enters the configuration mode and awaits input from the client.

Figure 4:
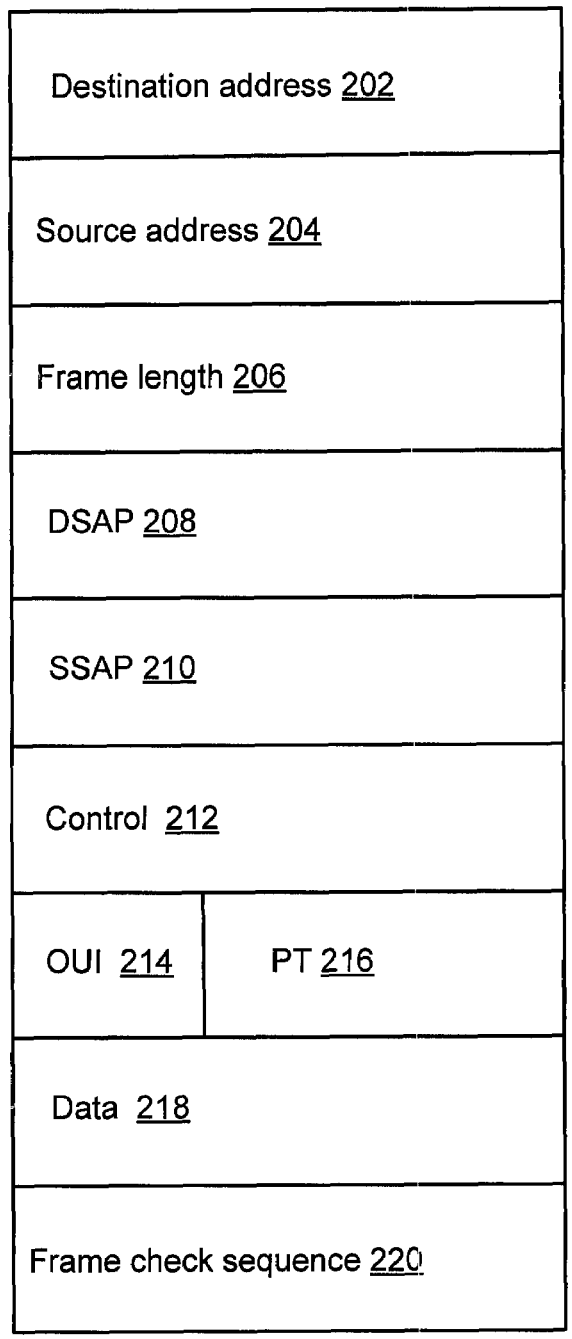
FIG. 4 is a block diagram of an exemplary configuration packet format.

FIG. 4 is a block diagram of an exemplary configuration packet 200. The configuration packet 200 is a layer 2 packet used to exchange configuration information between the AP 12 and the client 14. In this example, the configuration packet 200 format is IEEE 802.0 with a Sub-Network Access Protocol (SNAP) field. In a particular example, a protocol identification field in the SNAP header contains 3 bytes representing an organizationally unique identifier (OUI) and 2 bytes representing a product type (PT).

In this particular example, the configuration packet 200 includes a 6-byte destination address 202, a 6-byte source address 204 and 2-byte frame length 206. The configuration packet 200 includes a destination service access point (DSAP) field 208, a source service access point (SSAP) field 210, a control field 212 and, as described above, a SNAP header containing 3 bytes representing an OUI 214 and 2 bytes representing a PT 216. The configuration packet 200 also includes 100 bytes of data 218 and 4 bytes representing a frame check sequence 220.

Referring back to FIGS. 1, 2A-2D and 3A-3B, process 100 includes the client 14 detecting or otherwise inferring (e.g., using detector 47 in the client 14) the proximately located AP (108) and in response a set-up utility routine (e.g., using configuration engine 45) in the client generates (110) a configuration graphical user interface (GUI) displaying a set-up wizard.

A user responds to a question presented by the set-up wizard by entering an input that is received at the client 14 (112). The client 14 uses an algorithm to generate (114) a unique service set identifier (SSID) (e.g., using SSID generator 42) and secure key (e.g., using key generator 44 in the client 14). A SSID is a sequence of characters that uniquely names a wireless local area network (WLAN). This name allows clients to connect to a desired network when multiple independent networks operate in the same physical area.

The client's response generated in step 112, is transmitted to the AP 12. The AP 12 uses the same algorithm to generate (116) the SSID and secure key (e.g., using the SSID generator 42 and key generator 44 in the AP 12). In a particular example, the algorithm combines or hashes the input with some other information, such an AP media access control (MAC) address.

One of the AP or the client signals that the key generation process is complete by transmitting a challenge message to the other (e.g., using the verification engine 43). In FIG. 3B, the client 14 sends (118) a challenge text to the AP 12 (e.g., using verification engine 43) and the AP 12 encrypts (120) the challenge text (e.g., using the secure key and verification engine 43). The AP 12 sends the encrypted challenge text to the client 14.

The client 14 decrypts (122) the encrypted challenge text and compares (124) the received challenge text (e.g., using verification engine 43) with the original challenge text sent to the AP 12. If the encrypted challenge text is verified, the client 14 sends (126) confirmation to the AP 12 (e.g., using the verification engine 43) and process 100 terminates. More specifically, the confirmation can be of the form of an exit-set-up-mode message, upon receipt of which, the AP 12 can resume normal mode of operation (128). If the encrypted challenge text is determined to be incorrect, the client 14 sends (130) the AP 12 an error message and process 100 can be reinitiated (132).

Figure 5:
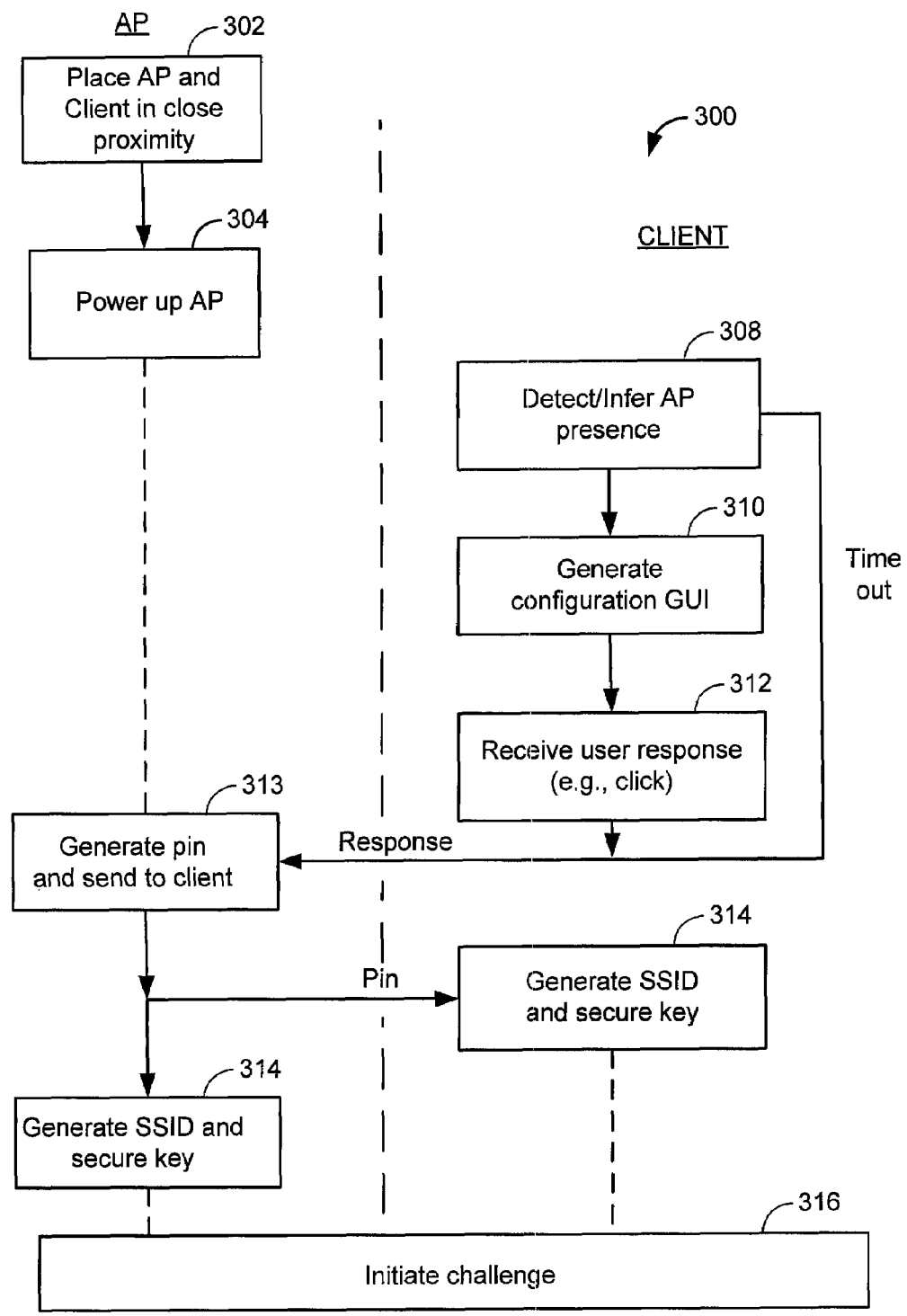
FIG. 5 is an interaction diagram of a process to set-up an AP initially using a wireless client having a GUI and keyboard and an auto-set-up feature.

In another particular embodiment, FIG. 5 is an interaction diagram of a process 300 to set-up an AP initially using a client having a GUI and keyboard and an auto-set-up feature. Referring now to FIGS. 1, 2A-D and 5, process 300 includes placing (302) an AP 12 in close proximity to a client 14 (e.g., less than 14 meters apart). As described above, the client 14 can be linked to the AP 12 either wirelessly or by a physical link (i.e., for configuration), such as, for example, Ethernet, hardwire, serial, Universal Serial Bus (USB) or a short distance point to point wireless link (e.g., infrared or blue tooth). When the client 14 and AP 12 are linked, the AP 12 is powered on (304). As discussed above, the client 14 detects or infers the presence of the AP 12 (308). In a particular example, configuration packets are multicast at 2 dBm and detected by the client 14. Multicasting can be continuous or for a predetermined period of time.

The client detects/infers the presence of the AP 12 and in response a set-up utility routine (e.g., configuration engine 45) in the client 14 generates (310) a configuration graphical user interface (GUI) displaying a prompt to auto-configure. A user responds (312) to the prompt on the GUI, such as, for example, a flashing cursor input line, and the response is sent to AP 12. In one implementation, the user may provide no response. For example, a default response for auto-configuration may be sent by the client 14 after a predetermined timeout without requiring user input (e.g., using configuration engine 45 and transceiver 20). The response can be of any form, and merely indicates acknowledgment of the prompt. In one implementation, the response can be of the form of a click on an auto-setup portion of a GUI displayed on the client 14.

The AP generates data (e.g., a personal identification number (PIN) or password) for use in creating the SSID and key (e.g., using the pin generator 41 in the AP 12) (313). Once generated, the PIN is transmitted to the client 14. Both the AP 12 and the client 14 use an algorithm to generate (314) a unique SSID and secure key using the PIN as a seed.

In the example shown in FIG. 5, the AP 12 sends data to the client 14 needed to generate the SSID and secure key in the client 14. In a particular example, the AP 12 provides an audio indication, such as a beep, or a video indication, such as a flashing signal (e.g., using configuration engine 45), in a predetermined manner to inform the user of a PIN that the AP 12 used to generate its SSID and secure key. In this example, the user maintains the PIN for further use. In other particular examples, the user can use, for example, a known unique identifier, e.g., a serial number or MAC of the AP 12 or a portion thereof, as a PIN, and no transmission from the AP 12 to the client 14 is required. In another example, the user can generate a PIN and transmit the PIN to the AP.

The client 14 generates the SSID and secure key using the PIN as discussed above. One of the client 14 or the AP notifies the other that the key generation process is complete, and initiates a challenge process, an example of which is shown in FIG. 3B.

Referring again to FIG. 3B, the client 14 sends (118) a challenge text to the AP 12. After the AP 12 receives the challenge text, the AP 12 encrypts the challenge text (120). The AP 12 sends the encrypted challenge text to the client 14.

The client 14 decrypts (122) the encrypted challenge text and compares (124) the received challenge text with the original challenge text sent to the AP 12. If the encrypted challenge text is verified, the client 14 sends (126) confirmation to the AP 12 and the process (e.g., process 300 of FIG. 3) terminates. More specifically, the confirmation can be of the form of an exit-set-up-mode message, upon receipt of which, the AP can resume normal mode of operation (128). If the encrypted challenge text is determined to be incorrect, the client 14 sends (130) the AP 12 an error message and the process (e.g., process 300 of FIG. 3) can be reinitiated (132).

Figure 6:
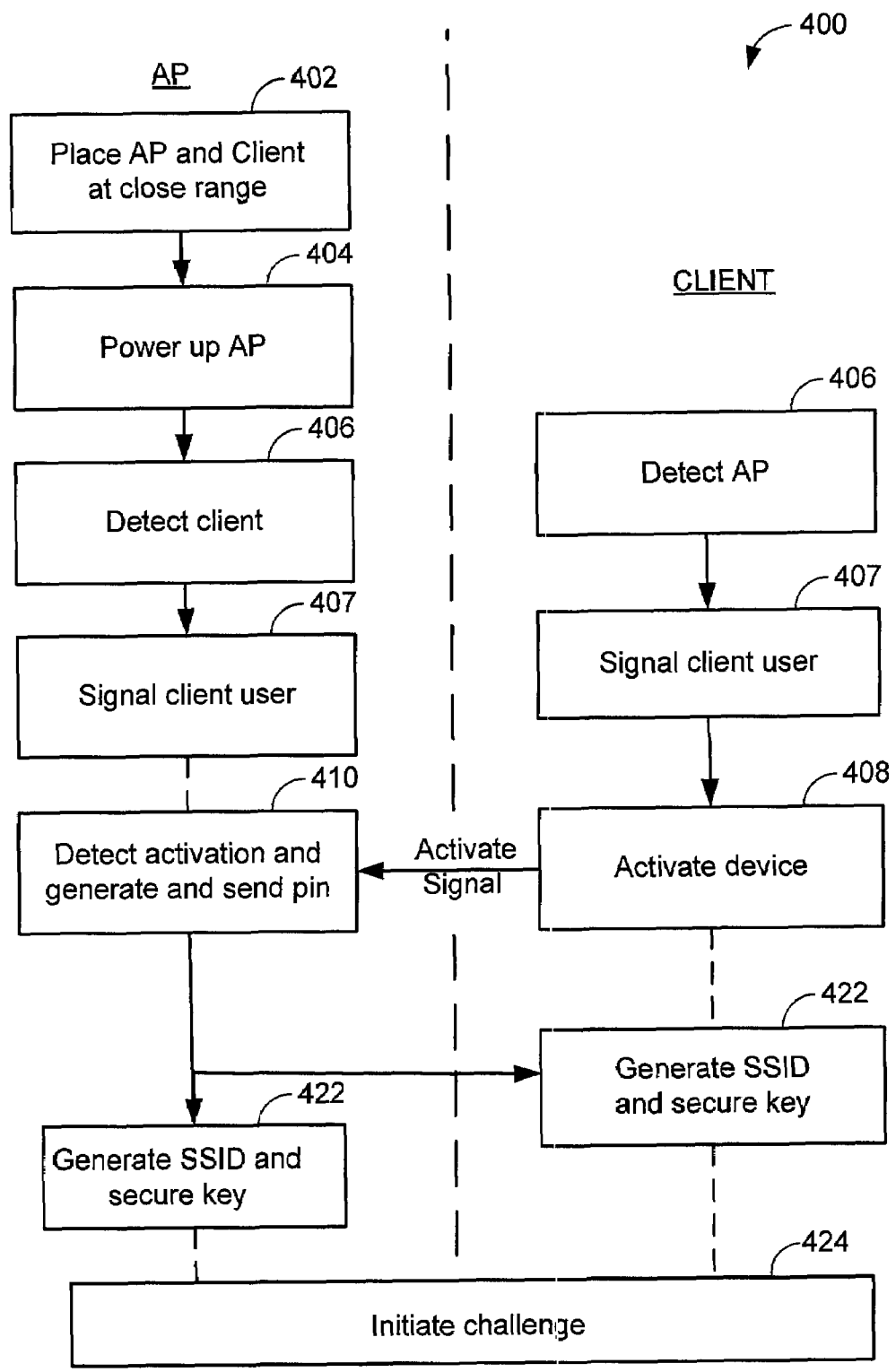
FIG. 6 is an interaction diagram of a process to set-up an AP initially using a wireless client having no GUI and no keyboard.

In another particular example, FIG. 6 is an interaction diagram of a process 400 to set-up an AP initially using a client having no GUI and no keyboard. Referring now to FIGS. 1, 2A-D, and 6, process 400 includes placing (402) an AP 12 in close proximity to a client 14 (e.g., less than 14 meters apart). As described above, the client 14 can be linked to the AP 12 either wirelessly or by a physical link (i.e., for configuration), such as, for example, Ethernet, hardwire, serial, Universal Serial Bus (USB) or a short distance point to point wireless link (e.g., infrared or blue tooth). When the client 14 and AP 12 are linked, the AP 12 is powered on (404). As discussed above, the client 14 detects or infers the presence of the AP 12 (406). In a particular example, configuration packets are multicast at 2 dBm and detected by the client 14. Multicasting can be continuous or for a predetermined period of time. Similarly, AP 12 detects or infers the presence of client 14 (406). In one implementation, AP 12 detects configuration packet requests received from client 14.

In one particular example, the detection/inference of the presence of the respective devices includes signaling to the other device/user. For example, once detected, one or both of the client 14 and the AP 12 can initiate a series of blinking lights (407) (e.g., under the control of the configuration engine 45) to designate that the respective devices are ready to start the configuration process. In one implementation, after a respective device detects/infers the presence of the other device (e.g., AP detects/infers the presence of the client and the client detects/infers the presence of the AP), a slow blinking light signal can be initiated that is visible to a user.

After both devices are ready for configuration, a user activates (408) a device (e.g., a button) on the client 14 following a certain pattern and the AP 12 detects the activation (e.g., using detector 47) and enters a configuration mode. In a particular implementation, the client 14 includes a button or other activation device, in hardware or software, for configuration that generates events to client firmware. A user can activate the button in a predefined pattern, or in other implementations, the user can press the button once or press and hold the button down to generate an activation event. The pressing of the button in this example implementation in a pattern or by holding it down tells the client 14 to begin a handshake. Example patterns are pressing the button once, pressing the button multiple times, pressing and holding down the button for a period of time, or pressing the button while applying power.

The AP 12 detects the activation of the device (e.g., the click on a button) and generates a PIN (410) that is transmitted to the client 14. Alternatively, the client 14 can generate the PIN and provide it to the AP 12. In another implementation, the client 14 and AP 12 exchange activation signals to generate a PIN. In a particular example, the user pushes a button in a designated pattern and the client 14 and AP 12 use the pattern to generate the PIN. In other particular examples, the AP 12 can use, for example, a serial number representing the AP 12 or a portion of the serial number representing the AP 12 as a PIN. Accordingly, in some implementations, no transmission of the PIN is required between the AP 12 and the client 14.

The client 14 and AP 12 use the PIN to generate (422) a unique SSID and secure key. When key generation is complete, a challenge process is initiated (424). As described above, either the client 14 or the AP 12 can initiate the challenge process. An exemplary challenge process is shown in FIG. 3B. In one implementation, the challenge process includes additional signaling between the devices. For example, if the encrypted challenge text is verified, the client 14 can send confirmation to the AP 12 and signal a transition from the configuration mode to a normal mode of operation (e.g., stop slow blinking). Similarly, if the encrypted challenge text is determined to be incorrect, the client 14 can signal (e.g., an error mode blink code) that indicates the failure and can cause the re-initiation of the process (e.g., the AP 12 and the client 14 can both return to the configuration mode at step 407).

Figure 7A:
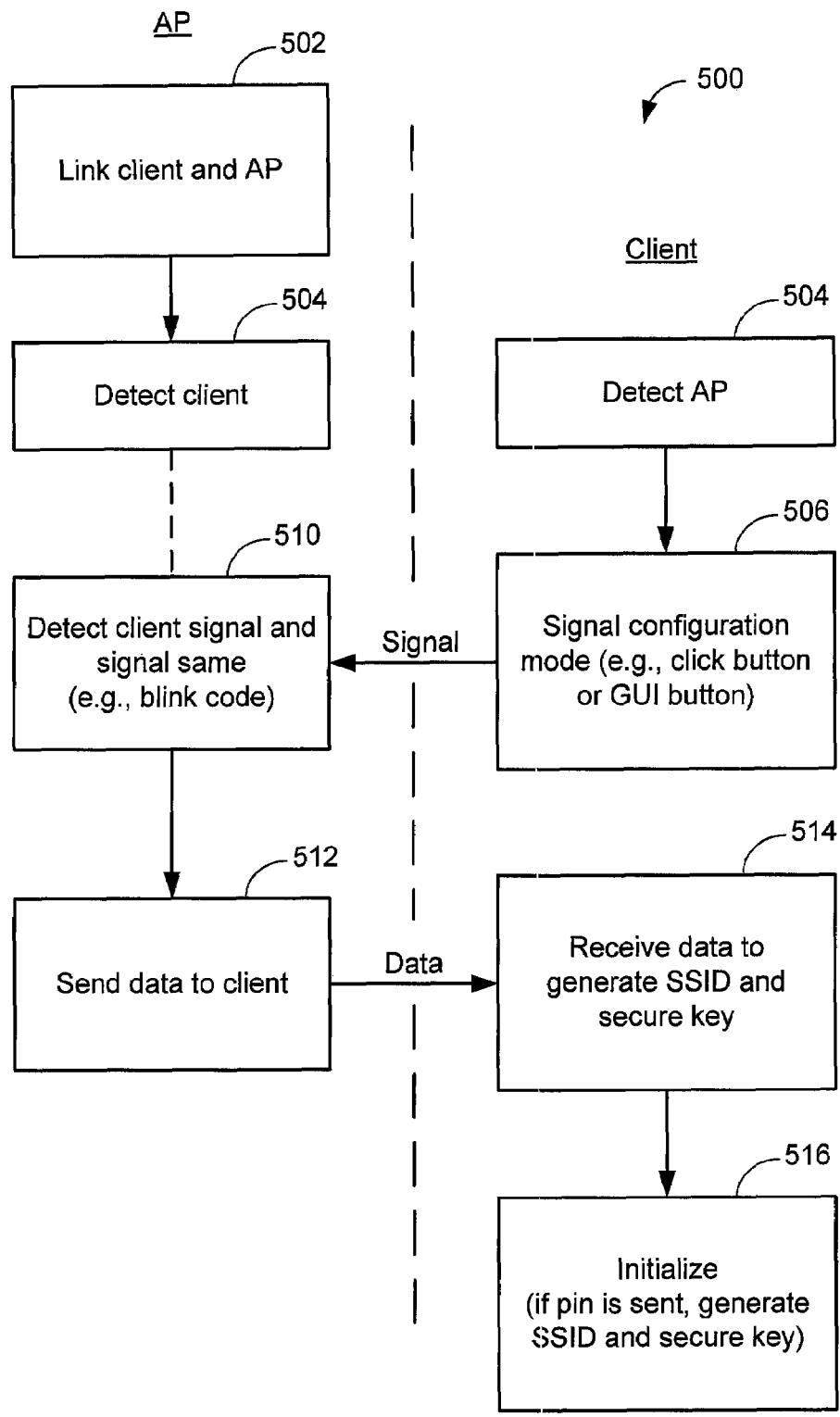
FIGS. 7A-7B are interaction diagrams of a process to initialize subsequent clients.

In another particular example, FIG. 7A is an interaction diagram of a process 500 to add additional clients after having initialized an AP. Referring to FIGS. 1, 2A-2d and 7A, process 500 includes linking the client 14 and the AP 12 using a trusted link (502). For example, the client 14 can be linked by a physical link, such as, for example, Ethernet, hardwire, serial, Universal Serial Bus (USB) or a short distance point to point wireless link (e.g., infrared or blue tooth). The linking of the client by the physical link is for the purposes of configuration as discussed herein. Other communications between the AP 12 and the client 14 can be wireless. The AP 12 and the client 14 detect/infer each other's presence (504).

The client signals (506) the beginning of the configuration mode (e.g., using the configuration engine 45 and transceiver 20). In a particular example, a user activates a device (e.g., a button or a GUI button) on the client 14 following a certain pattern and the client 14 detects the activation, enters a configuration mode and signals the AP 12 (508). In a particular example, the AP 12 displays a blink code using blinking lights on the AP 12 to acknowledge the client 14 entering the configuration mode. Thereafter, the AP 12 sends (512) information sufficient for the client 14 to initialize (i.e., receive the sent data at step 514 and initialize the client 14 at step 516).

In one implementation, the AP 12 sends the SSID and secure key. Alternatively, the AP 12 can transmit information (e.g., a PIN) that can be used by the client 14 to generate the SSID and secure key. In another implementation, the client 14 and AP 12 can exchange activation signals to generate sufficient data so that the client 14 can generate the SSID and secure key.

Figure 7B:
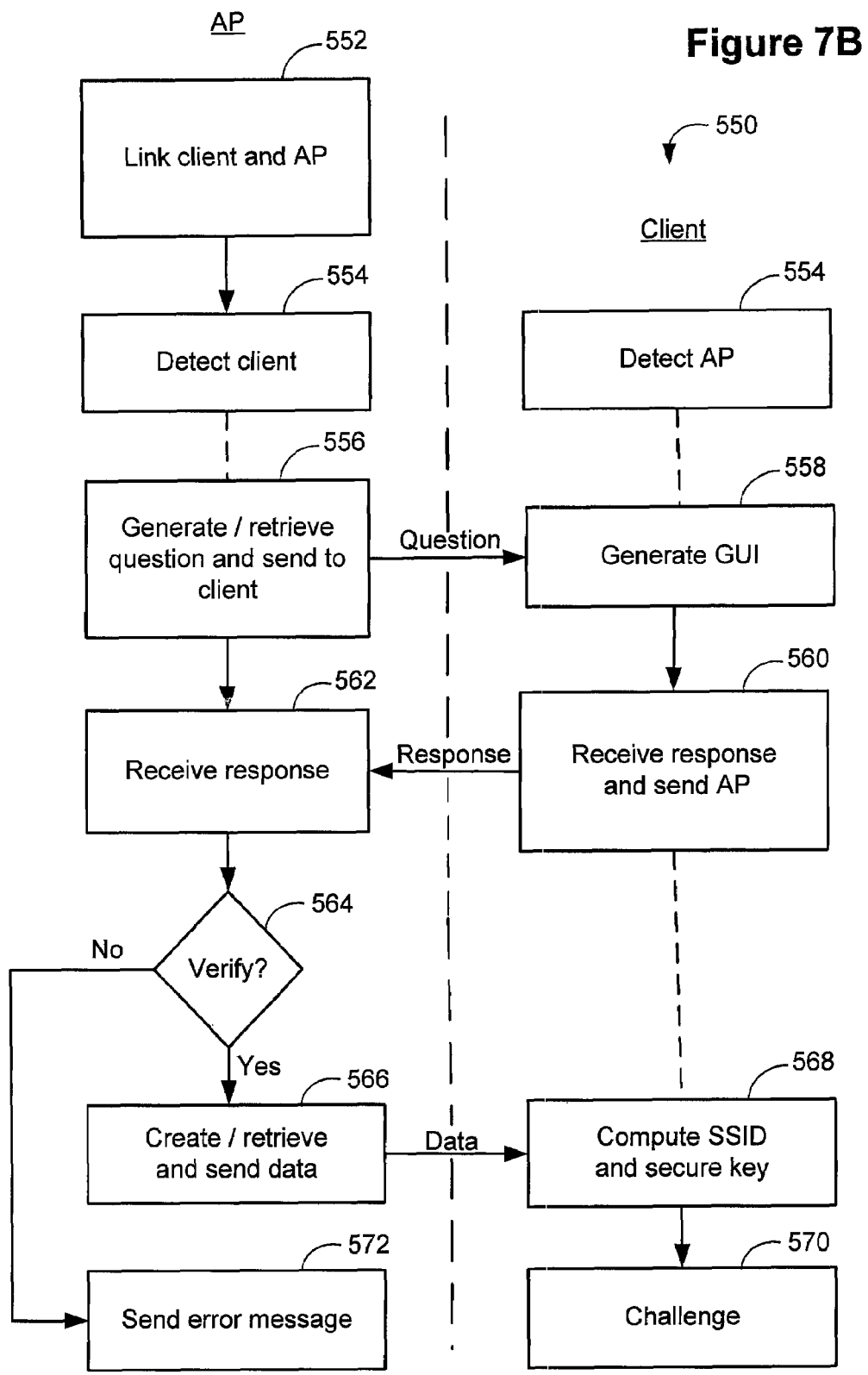

For untrusted clients with a GUI and a keyboard, an alternative process can be used to configure additional clients. In another particular example, FIG. 7B is an interaction diagram of an alternative process 550 to add additional clients after having initialized an AP. Referring to FIGS. 1, 2A-2d and 7B, process 550 includes linking the client 14 and the AP 12 (552). For example, the client 14 can be linked wirelessly or using a physical link, such as, for example, Ethernet, hardwire, serial, Universal Serial Bus (USB) or a short distance point to point wireless link (e.g., infrared or blue tooth) (i.e., the difference being the physical link in this example is "untrusted" as compared to the trusted link described above with respect to FIG. 7A). The linking of the client by the physical link is for the purposes of configuration as discussed herein. Other communications between the AP 12 and the client 14 can be wireless. The AP 12 and the client 14 detect/infer each other's presence (554).

After the detecting step 554, the AP 12 generates/retrieves a question and signals (556) the client 14 (e.g., using the configuration engine 45). In one implementation, the AP 12 can unicast to the target client 14 a predetermined question associated with the already established SSID link and in response a set-up utility routine (e.g., the configuration engine 45) in the client 14 generates (558) a configuration graphical user interface (GUI) displaying a set-up wizard.

A user responds to a question presented by the set-up wizard by entering an input that is received at the client 14 (560). The question and response challenge is designed to differentiate authorized from unauthorized clients. The question and answer can be previously published to authorized clients using out of band techniques (e.g., in materials provided to the client separately). The response is transmitted to and received at the AP 12 (562). AP 12 compares the response with an expected answer (564). If the response matches the expected answer, the AP 12 transmits data sufficient for the client 14 to generate a SSID and secure key (566). Alternatively, if the response does not match, the AP 12 can generate an error message that is transmitted to the client 14 (572) and the process can be re-initiated.

If the response matches, the client 14 uses an algorithm to generate (568) a unique service set identifier (SSID) (e.g., using SSID generator 42) and secure key (e.g., using the received data and SSID and key generator engines 42,44 in the client 14). When key generation is complete, a challenge process is initiated (570). As described above, either the client 14 or the AP 12 can initiate the challenge process. An exemplary challenge process is shown in FIG. 3B.

In another particular example, FIG. 8 is an interaction diagram of a process 600 to initialize a second client, where the second client can include a keyboard and GUI (i.e., screen) or, alternatively, no keyboard and no GUI. Referring again to FIGS. 1, 2A-2D and 8, process 600 includes placing the client 14 in proximity to the AP 12 (602) and the client 14 and the AP 12 detecting each other (604). As described above, the detection process can include a client 14 sending configuration request packets to an AP 12 (e.g., at low power when sent wirelessly to prevent unwanted snooping) and the AP 12 sending configuration packets to the client 14 (e.g., at low power).

Upon detection of the client 14, the AP 12 initiates configuration of the client. More specifically, in one implementation, the AP initiates a blink code that can be visible to a user of the client 14 (606). The blink code can be used to convey information sufficient to generate a SSID and secure key in the client. Alternatively, the blink code can merely signal the beginning of the configuration cycle. If the client includes a GUI, the AP 12 sends (608) a previously configured question to the client. A client configuration GUI is generated (610) that requests that the user answer the received question to which the user provides a response (612). The response can be the answer to the question, or alternatively, if the client 14 has no GUI, then the user can provide an alternative response (e.g., a blink code response of the form of a complementary response to the blink code received from the AP 12). In one implementation, the alternative response is a code that repeats the blink code provided by the AP 12. The alternative response can be provided as by a user pressing a button as described above. The client 14 uses the response (e.g., answer) to compute a SSID and secure key (614).

The client 14 computes the SSID and secure key from the received data (user input) as described above. When configuration is complete, a challenge process is initiated (616). As described above, either the client 14 or the AP 12 can initiate the challenge process. An exemplary challenge process is shown in FIG. 3B. In one implementation, the challenge process includes additional signaling between the devices. For example, if the encrypted challenge text is verified, the client 14 can send confirmation to the AP 12 and signal a transition from the configuration mode to a normal mode of operation. Similarly, if the encrypted challenge text is determined to be incorrect, the client 14 can signal (e.g., an error mode blink code) that indicates the failure and can cause the re-initiation of the process (e.g., the AP 12 and the client 14 can both return to the configuration mode at step 604).

Figure 9:
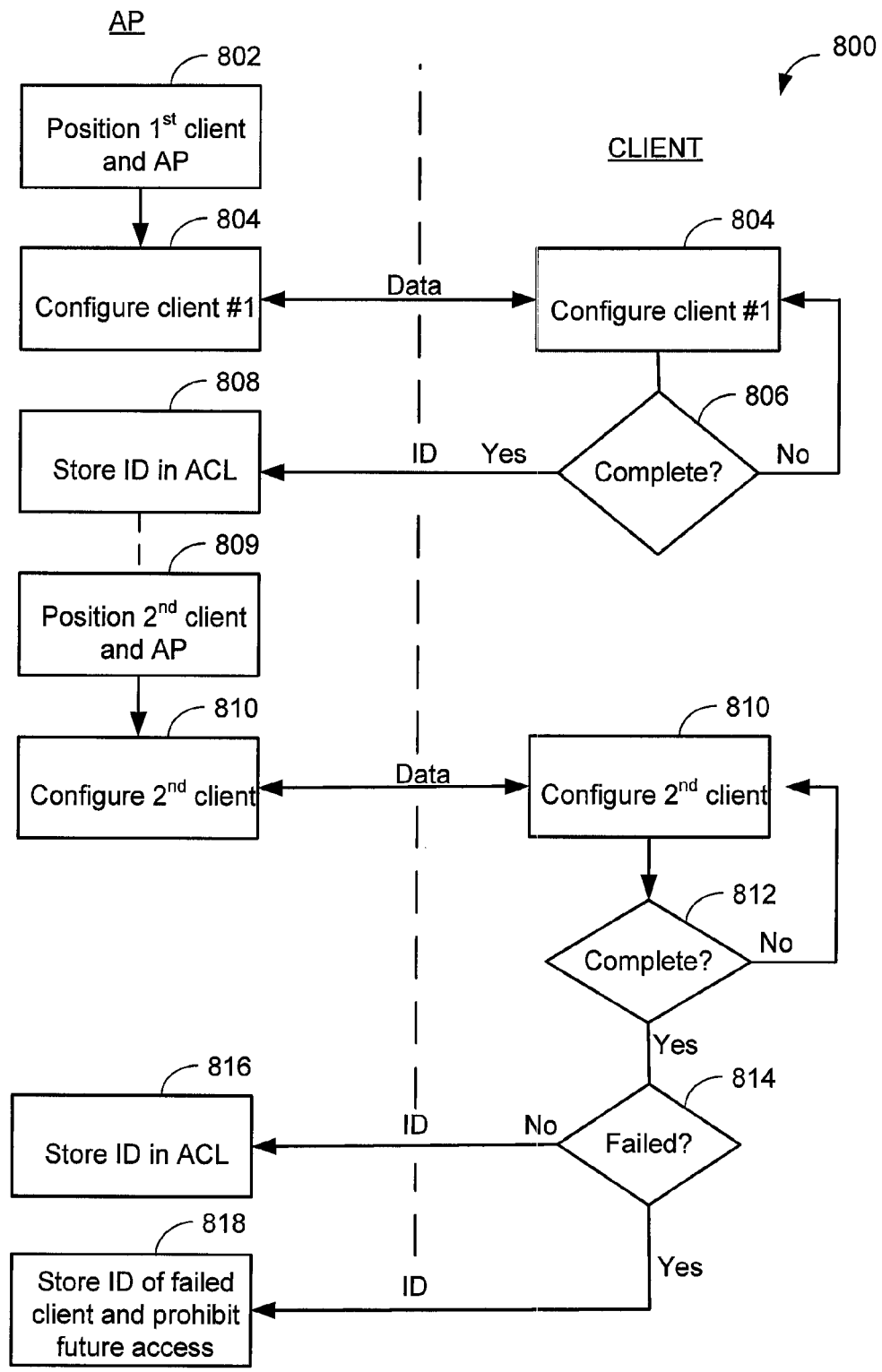
FIG. 9 is an interaction diagram of a process to set-up an AP with multiple clients.

FIG. 9 is an interaction diagram of a process 800 to set-up an AP with multiple clients. This particular example can be used for clients that require enhanced security and incorporates a client's unique identity, such as a client's MAC address, into an Access Control List (ACL) 48 maintained by, for example, configuration engine 45 of AP 12. In one particular example the ACL 48 is a table that tells the AP 12 whether access rights are granted to a client (e.g., client 14). The MAC address identifies a client's unique hardware number.

Referring now to FIGS. 1, 2A-2D, and 9, process 800 includes placing (802) a first client in close proximity to the AP 12. Configuration (804) is performed using any of the processes described with respect to FIGS. 3, 5, and 6. When configuration (804) is complete (806), the AP 12 stores (808) a unique identity representing the first client in an ACL 48 located in the AP 12. The stored unique identifier represents the first client's granted access to the AP 12. In one particular example, the first client's MAC address is stored in the ACL 48. Other examples include storing one or more other unique identifiers associated with the first client in the ACL 48.

A second client is positioned (809) in close proximity to AP 12 and is configured by an exchange of information (e.g., using a previously stored PIN) using any of the processes described with respect to FIG. 7A-B or 8. When the information exchange and configuration is complete (812), a check is made to determine if the configuration process was successful (814). If successful, the AP 12 stores (816) a unique identity representing the second client in an ACL 48 located in the AP 12.

All subsequent clients (e.g., a third, fourth and fifth client) are configured in a similar manner and a unique identifier (e.g., MAC address) for each client is stored in the ACL 48. In the event of a failed configuration attempt by a subsequent client (at step 814), the AP 12 registers a unique identifier that represents the subsequent client's denied access to the AP 12 (818). The denied access identifier can be stored in the ACL 48. When access is denied the AP 12 assumes the client is a rogue client attempting to hack, snoop or intrude the network 10. In a particular example, the AP 12 continues to block the rogue client (e.g., preventing the client from initializing with the processes described above with respect to FIGS. 7A-B and 8) from accessing the network 10 until, for example, a network administrator grants access to the suspected rogue client.

A number of embodiments have been described. Nevertheless, it will be understood that various modifications may be made. For example, an AP and client can exchange configuration request packets and configuration packets over a physical connection link to process set-up and update information. The client and the AP can initially pass information required to set up an SSID and secure key. After establishing the SSID and secure key, the client and AP can exchange other configuration information using, for example, configuration packets.

Further, though the discussion above is directed to initializing clients, similar methods can be used to re-initialize (i.e., update) clients that have relocated, have been configured to link to other systems, and are returning to be linked again to a configured AP. Methods as described above with respect to FIGS. 7A-B and 8 can be used to update configuration information in a client to re-initialize with an AP. Though the various engines and components have been described above as separate, plural components can be combined in singular circuitry, engines, programs or the like. The methods described may be implemented in embedded systems, hardware, firmware, software, or combinations thereof, or in a computer program product tangibly embodied in a computer readable storage device. Storage devices suitable for tangibly embodying the computer program include all forms of non-volatile memory including semiconductor memory devices. Accordingly, other embodiments are within the scope of the following claims.

What is claimed is:

1. An access point comprising:
    a transmitter to transmit at low power configuration packets to a proximately located client and to send messages to the proximately located client;
    a receiver to receive a client input from the proximately located client;
    an engine to generate a unique service set identifier (SSID) and a secure key from the client input; and
    a verification engine to:
        send an original client text to the proximately located client;
        receive an encrypted version of the original client text encrypted by the proximately located client using the secure key; and
        verify the encrypted version of the original client text using the original client text sent to the proximately located client.

2. The access point of claim 1 wherein the transmitter transmits the configuration packets and messages at a power of less than 3 dBm.

3. The access point of claim 1 wherein the transmitter transmits configuration packets for a predefined time limit.

4. The access point of claim 1 wherein the configuration packets are data packets comprising IEEE 802.0 fields with a Sub-Network Access Protocol (SNAP) field comprising a protocol identification field in a SNAP header including 3 bytes representing an organizationally unique identifier (OUI) and 2 bytes representing a product type.

5. The access point of claim 1 wherein the verification engine is operative to exchange text between the proximately located client and the access point and hash the exchanged text.

6. The access point of claim 1 wherein the verification engine is operative to hash the client input.

7. The access point of claim 1 wherein the verification engine is operative to determine an authenticity of a received encrypted message from the proximately located client.

8. The access point of claim 1 wherein the transmitter is operative to send an error message to the proximately located client if a verification fails and a success message to the proximately located client if the verification succeeds.

9. The access point of claim 1 wherein the configuration packets are update packets.

10. The access point of claim 1 wherein the engine further comprises a key generator for generating the secure key and a SSID generator for generating the SSID from the client input.

11. The access point of claim 1 further comprising a detector for detecting the presence of a client in close proximity to the access point.

12. The access point of claim 1 further comprising a power selector operable to control a power level output by the transmitter and enable transmission at low power when configuring the proximately located client.

13. The access point of claim 1 further comprising a configuration engine operable to process the client input and signal processing modes and codes to the proximately located client.

14. A method comprising:
    transmitting at low power configuration packets from an access point to a proximately located client and sending messages to the proximately located client;
    receiving, by the access point, a client input from the proximately located client;
    generating, by the access point, a unique service set identifier (SSID) and a secure key from the client input;
    sending, by the access point, an original client text to the proximately located client;
    receiving, by the access point, an encrypted version of the original client text encrypted by the proximately located client using the secure key; and
    verifying, by the access point, the encrypted version of the original client text using the original client text sent to the proximately located client.

15. The method of claim 14, further comprising transmitting the configuration packets and messages at a power of less than 3 dBm.

16. The method of claim 14, further comprising transmitting the configuration packets for a predefined time limit.

17. The method of claim 14, further comprising:
    exchanging text between the proximately located client and the access point; and
    hashing the exchanged text.

18. The method of claim 14, further comprising hashing the client input.

19. The method of claim 14, further comprising determining an authenticity of a received encrypted message from the proximately located client.

20. The method of claim 14, further comprising:
    sending an error message to the proximately located client if verifying the client text fails; and
    sending a success message to the proximately located client if verifying the client text succeeds.

21. The method of claim 14, further comprising detecting a presence of a client in close proximity to the access point.

22. The method of claim 14, further comprising:
    controlling a power level output of the transmission of the lower power configuration packets; and
    enabling the transmission at low power when configuring a proximately located client.

23. The method of claim 14, further comprising:
    processing the client input; and
    signaling processing modes and codes to the proximately located client.

* * * * *